Patented June 30, 1953

2,643,996

UNITED STATES PATENT OFFICE 2,643,996

TRIAZINE MONOAZO DYESTUFFS

Willy Widmer, Bottmingen, and Alfred Fasciati, Basel, Switzerland, assignors to Ciba Limited, Basel, Switzerland, a Swiss firm No Drawing. Application August 21, 1950, Serial No. 180,708. In Switzerland September 16, 1949

8 Claims. (Cl. 260—153)

According to this invention valuable new monoazo dyestuffs are made by coupling a diazotized orthoaminohydroxybenzene sulfonic acid with a compound of the general formula

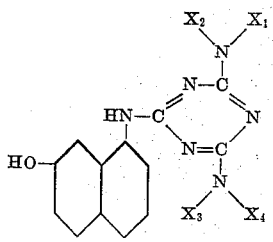

in which $X_1$, $X_2$, $X_3$ and $X_4$ together correspond to the formula $C_nH_{2n+4}$, where $n$ is a whole number not higher than 10. The meaning of the expression "$X_1$, $X_2$, $X_3$ and $X_4$ together correspond to the formula $C_nH_{2n+4}$" is that the number of carbon atoms present in all X's together is $n$ and the number of hydrogen atoms present in all X's together is $(2n+4)$ and the four X's contain no other atoms.

As diazotized ortho-amino-hydroxybenzene sulfonic acids there come into consideration advantageously diazotized ortho-amino-hydroxybenzene monosulfonic acids, for example, diazotized 2 - amino-1-hydroxybenzene-4-sulfonic acid. Especially valuable dyestuffs can be made from ortho-amino-hydroxybenzene mono-sulfonic acids which contain, in addition to the amino group, the hydroxyl group and the sulfonic acid group, a further substituent which is incapable of salt formation. Among ortho-amino-hydroxybenzene mono-sulfonic acids of this kind there are especially valuable as starting materials those which contain as a substituent incapable of salt formation a methyl group or advantageously a nitro group or a halogen atom, preferably a chlorine atom. As examples of amino-hydroxybenzene sulfonic acids containing such a further substituent there may be mentioned:

4 - methyl - 2 - amino - 1 - hydroxybenzene - 5-sulfonic acid,
4 - methyl - 2 - amino - 1 - hydroxybenzene - 6-sulfonic acid,
4 - methoxy - 2 - amino - 1 - hydroxybenzene - 6-sulfonic acid,
4 - bromo - 2 - amino - 1 - hydroxybenzene - 6-sulfonic acid,
6 - chloro - 2 - amino - 1-hydroxybenzene-4-sulfonic acid,
6 - acetylamino - 2 - amino - 1 - hydroxybenzene-4-sulfonic acid,
4 - acetylamino - 2 - amino - 1 - hydroxybenzene-6-sulfonic acid,
5 - nitro - 2 - amino - 1 - hydroxybenzene - 4-sulfonic acid,
6 - nitro - 2 - amino - 1 - hydroxybenzene - 4-sulfonic acid.

Especially valuable results are obtained when there is used as starting material the diazo compound of 4-nitro-2-amino-1-hydroxybenzene-6-sulfonic acid or of 4-chloro-2-amino-1-hydroxybenzene-6-sulfonic acid.

In the compounds of the above mentioned general formula, which are also used as starting materials in the present process, at least one of the symbols $X_1$, $X_2$, $X_3$ and $X_4$ represents an alkyl hydrocarbon radical. As alkyl hydrocarbon radicals there come into consideration preferably saturated, unbranched or branched radicals. In the triazine derivatives of the above formula, in which the total number of carbon atoms present in all the four X's does not exceed 10 and is preferably between 2 and 10, the carbon atoms may be distributed among the four X's in any desired manner. However, in synthesizing the triazine compounds it will be of advantage to take into account the accessibility of the amines serving as starting materials and their reactivity with cyanuric halides. In this connection there may be mentioned as examples more especially triazine compounds in which the radicals

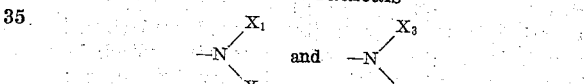

are identical with one another, for example, triazine compounds of the formula

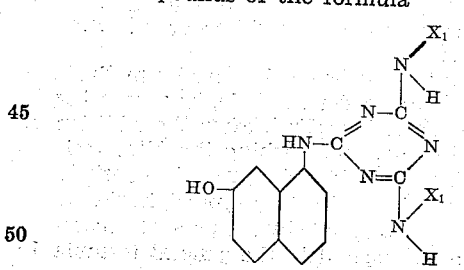

in which the two radicals $X_1$ represent two identical alkyl hydrocarbon radicals each containing at most 5 carbon atoms, such as methyl, ethyl or n-butyl groups.

The compounds of the general formula

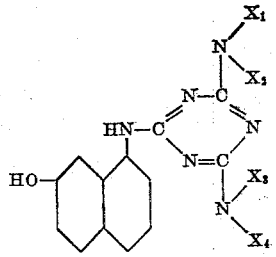

used as starting materials in the present process, and in which $X_1$, $X_2$, $X_3$ and $X_4$ together correspond to the formula $C_nH_{2n+4}$, where $n$ is a whole number not higher than 10, can be prepared by methods in themselves known, for example, 1 mol of a cyanuric halide, advantageously cyanuric chloride, may be condensed with 1 mol of 1-amino-7-hydroxynaphthalene and with 2 mols of a primary or secondary aliphatic amine containing at most 5 carbon atoms, or with 1 mol each of two different non-tertiary amines which together contain at most 10 carbon atoms, or with 1 mol of a primary or secondary aliphatic amine containing at most 10 carbon atoms, for example, butylamine and 1 mol of ammonia. For this purpose it is of advantage first to carry out the condensation with 1-amino-7-hydroxynaphthalene and, when the radicals of 2 different amines are to be introduced into the molecule, advantageously to carry out last the condensation with the amine which reacts more easily or with ammonia. When 2 mols of the same amine are to be reacted with the condensation product from 1 mol of a cyanuric halide and 1 mol of 1-amino-7-hydroxynaphthalene, it is obviously of advantage to carry out the reaction in a single operation.

The condensations are advantageously carried out in an aqueous medium and in the presence or with the addition of an acid-binding agent. It is generally of advantage to bring the cyanuric halide into reaction in a very finely divided form. As acid-binding agents for the reaction with the cyanuric halide it is in some cases of advantage to use the amines which are to be condensed with the condensation product resulting from the first stage of the reaction.

In the present process coupling is advantageously conducted in an alkaline medium. Thus, for example, an alkali may be added to the solution or suspension of the diazotized ortho-hydroxyaminobenzene sulfonic acid until the acid reaction to Congo has disappeared, and then to couple it with an aqueous suspension which has been prepared by stirring the coupling component into water and adding an equivalent quantity of an alkali hydroxide and also an excess of an alkali carbonate. In general, coupling is favored by the addition of pyridine or advantageously ethanol.

The dyestuffs may be worked up by methods in themselves known, for example, by separating them by filtration, if desired, after the addition of sodium chloride, and washing the filter residue with sodium chloride solution. The dyestuffs may, if desired, be purified by reprecipitation.

The dyestuffs obtainable by the present process are new and correspond to the general formula

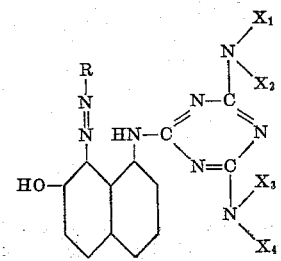

in which R represents the radical of a benzene sulfonic acid containing a hydroxyl group in ortho-position with respect to the azo-linkage, and $X_1$, $X_2$, $X_3$ and $X_4$ together correspond to the formula $C_nH_{2n+4}$, where $n$ is a whole number not higher than 10.

These new products can be used for dyeing a very wide variety of materials.

Especially valuable results are obtained by treating the dyestuffs with an agent yielding metal. This treatment may be carried out in known manner in substance, in the dyebath or on the fiber. Thus metallization in substance may be carried out, for example, with an agent yielding chromium in an acid, neutral or weakly alkaline medium, if desired, in the presence of suitable additions, such as acids, neutral salts or bases, and if desired with the use of an acid-binding agent, an organic solvent or a further addition assisting the formation of complexes, and under atmospheric or superatmospheric pressure.

Metallization on the fiber, advantageously chroming the dyestuff on wool, may, for example, be carried out according to the known methods of after-chroming. A very large number of the new dyestuffs, in so far as they contain a single sulfonic acid group, are also suitable for dyeing by the single bath chroming process, that is to say, for dyeing with the addition of a neutral alkali chromate and ammonium sulfate.

Especially valuable are the dyestuffs obtainable by the present process from diazotized 4-nitro- or 4-chloro-2-amino-1-hydroxybenzene-6-sulfonic acid, which yield on wool either by the after-chroming process or by the single bath chroming process dyeings having very good properties of fastness, especially good fastness to light and excellent fastness to fulling and potting.

The following examples illustrate the invention, the parts and percentages being by weight unless otherwise stated, and the relationship of parts by weight to parts by volume being the same as that of the kilogram to the liter:

*Example 1*

23.4 parts of 4-nitro-2-amino-1-hydroxy-benzene-6-sulfonic acid are suspended in 100 parts of water and 5 parts of hydrochloric acid of 30 per cent strength, and diazotized at 5–10° C., while cooling externally, with 25 parts by volume of a 4N-solution of sodium nitrite. The diazo solution is mixed with a quantity of sodium carbonate sufficient to give a neutral reaction to Congo, and then coupled with a suspension of 35 parts of the compound of the formula

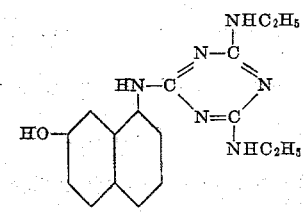

in 250 parts by volume of alcohol, 25 parts of sodium carbonate and 4 parts of sodium hydroxide. The whole is stirred at 8–10° C. until the coupling is complete. It is then diluted to 1000 parts by volume with water, the greater part of the alcohol is distilled off by heating, and the dyestuff is precipitated by the addition of 10 parts of sodium chloride per 100 parts by volume of coupling mixture. After cooling, the whole is filtered, and the filter residue is washed with sodium chloride solution of 10 per cent. strength and dried. For the purpose of purification the dyestuff may be dissolved hot in dilute sodium carbonate solution, filtered, and again precipitated with sodium chloride. In the dry state it is a black powder which dissolves in concentrated sulfuric acid with a red coloration, and dyes wool from an acetic acid bath grey-blue tints which change to green tints having very good properties of fastness upon being after-chromed. The dyestuff is excellently suited for dyeing by the single bath chroming process, whereby very fast green tints are also obtained.

Valuable dyestuffs which also dye wool green tints by the after-chroming or single bath chroming process are obtained by coupling diazotized 4 - nitro - 2 - amino - 1 - hydroxybenzene - 6 - sulfonic acid in the manner described above with a compound of the formula (1)
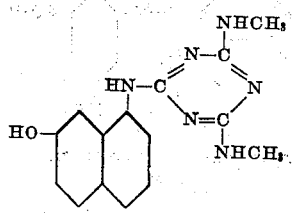

(2)
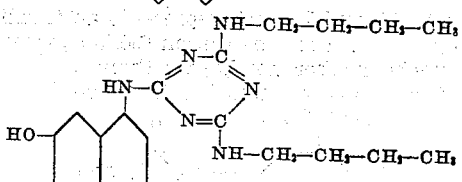

(3)
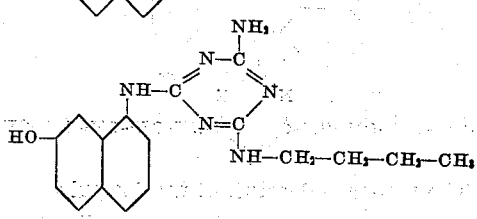

or (4)
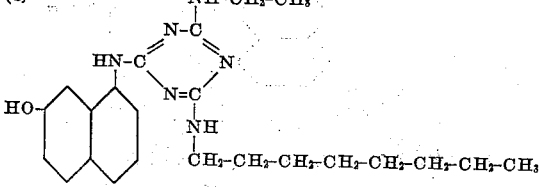

The triazine compound used as coupling component in the first paragraph of this example and having the formula given may be prepared as follows:

15.9 parts of 1-amino-7-hydroxynaphthalene are dissolved in 500 parts of water and 10 parts by volume of 10N-hydrochloric acid at 80–85° C.

The solution is then cooled to 60° C., and then mixed, while stirring well, with 18.4 parts of cyanuric chloride which has been dissolved with heat in 50 parts by volume of acetone. After about 10 minutes the suspension is mixed with ethylamine until the reaction is distinctly alkaline to Brilliant Yellow. The suspension is then stirred for a further 12 hours at room temperature, during which the reaction should remain throughout alkaline to Brilliant Yellow. In the case of need some further ethylamine may be added. After this period the reaction product contains at most only traces of the diazotized starting material.

The reaction mixture is then filtered and the filter residue is washed with water. It is then suspended in 500 parts of water and 50 parts by volume of hydrochloric acid of 30 per cent. strength, and then powerfully stirred. The whole is then filtered and the filter residue is washed with water.

For the purpose of purification the resulting pale grey condensation product is dissolved in alcohol and again precipitated by dilution with water.

The triazine compounds Nos. 1 and 2 mentioned in the second paragraph of this example can be prepared by the same method by using, instead of ethylamine, a corresponding quantity of methylamine or n-butylamine. The triazine compounds Nos. 3 and 4 also mentioned in the second paragraph of this example can be prepared by condensing 15.9 parts of 1-amino-7-hydroxynaphthalene as indicated above with 18.4 parts of cyanuric chloride which has been dissolved in 50 parts by volume of acetone. After about 10 minutes the suspension is mixed with 7.3 parts of butylamine (or with 12.7 parts of octylamine) and stirred for 30 minutes. Ammonia (or ethylamine) is then added until the reaction is and remains distinctly alkaline to Brilliant Yellow. After 12 hours' stirring at 25–30° C. the reaction mixture is filtered and the filter residue washed with water and further purified as indicated above for compounds Nos. 1 and 2.

*Example 2*

22.4 parts of 4-chloro-2-amino-1-hydroxybenzene-6-sulfonic acid are diazotized in 200 parts of water in the usual manner with the aid of hydrochloric acid and sodium nitrite. The diazo solution is mixed with a quantity of sodium carbonate sufficient to give a reaction neutral to Congo, and added to a suspension cooled to 5° C. and obtained by mixing 38.0 parts of the compound of the formula

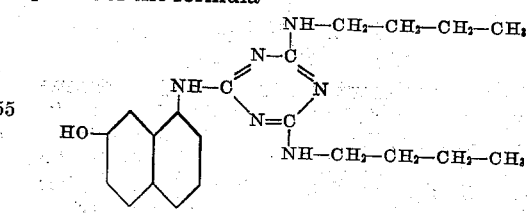

and 4 parts of sodium hydroxide in 250 parts by volume of alcohol and 25 parts of sodium carbonate. The whole is stirred at 8–10° C. until the coupling is complete. The whole is then diluted to 1000 parts by volume with water, the greater part of the alcohol is distilled off with heat, the dyestuff completely precipitated by the addition of 10 parts of sodium chloride per 100 parts by volume of coupling mixture. After cooling, the whole is filtered, and the filter residue is washed with sodium chloride solution of 10 per cent. strength and dried. In the dry state the dyestuff is a blue-black powder which dissolves in dilute sodium carbonate solution with a blue coloration and in concentrated sulfuric acid with a red coloration, and dyes wool from an acetic acid bath brown-red tints which when after-chromed change to grey tints having very good properties of fastness. The dyestuff is also excellently suited for dyeing by the single bath chroming process, whereby very fast grey tints are also obtained.

*Example 3*

100 parts of well wetted wool are entered at 60° C. into a dyebath which contains in 4000 parts of water 1.5 parts of the dyestuff obtainable as described in the first paragraph of Example 1, 4 parts of acetic acid of 40 per cent. strength and 10 parts of crystalline sodium sulfate. The temperature is raised to the boil in the course of 30 minutes and dyeing is carried on at the boil for 45 minutes. 5 parts of sulfuric acid of 10 per cent. strength are then added and dyeing is continued for a further 15 minutes. The dyebath is then cooled to about 70° C., 1 part of potassium bichromate is added, and the whole is brought to the boil and chroming is carried on at the boil for about 40 minutes. The wool is dyed green, and the dyeing is remarkably fast to fulling and potting and very fast to light.

*Example 4*

A dyebath is prepared with 4000 parts of water, 1 part of potassium chromate, 1 part of ammonium sulfate, 10 parts of crystalline sodium sulfate and 1.5 parts of the dyestuff obtainable as described in the first paragraph of Example 1. 100 parts of well wetted wool are entered into the dyebath at 60° C., the temperature is raised to the boil in the course of 30 minutes and boiling is continued for 45 minutes. 0.5 part of acetic acid of 40 per cent. strength is then added and boiling is continued for a further 45 minutes. The dyeing so obtained is somewhat purer and more blue-green than the dyeing produced as described in Example 3.

What we claim is:

1. A monoazo dyestuff of the general formula

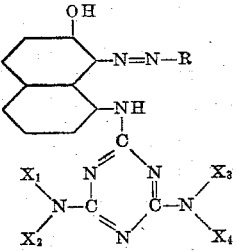

in which R represents the radical of a benzene sulfonic acid containing a hydroxyl group in ortho-position with respect to the azo-linkage, and $X_1$, $X_2$, $X_3$ and $X_4$ each corresponds to the formula $C_{n-1}H_{2n-1}$, where $n$ is a whole number which is at most 11, the total number of carbon atoms present in $X_1$, $X_2$, $X_3$ and $X_4$ together being at least 1 and at most 10.

2. A monoazo dyestuff of the formula

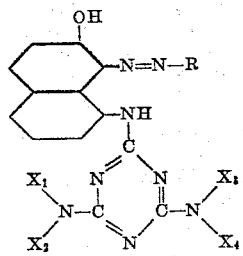

in which R represents the radical of a benzene-monosulfonic acid containing a hydroxyl group in ortho-position with respect to the azo-linkage and $X_1$, $X_2$, $X_3$ and $X_4$ each corresponds to the formula $C_{n-1}H_{2n-1}$, where $n$ is a whole number which is at most 11, the total number of carbon atoms present in $X_1$, $X_2$, $X_3$ and $X_4$ together being at least 1 and at most 10.

3. A monoazo dyestuff of the general formula

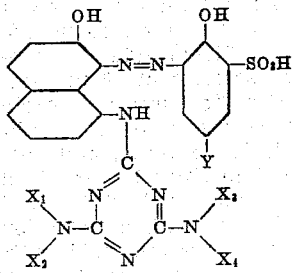

in which Y represents a member of the group consisting of a nitro group and a chlorine atom and $X_1$, $X_2$, $X_3$ and $X_4$ each corresponds to the formula $C_{n-1}H_{2n-1}$, where $n$ is a whole number which is at most 11, the total number of carbon atoms present in $X_1$, $X_2$, $X_3$ and $X_4$ together being at least 1 and at most 10.

4. A monoazo dyestuff of the general formula

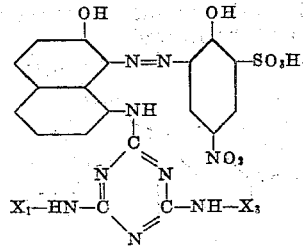

in which $X_1$ and $X_3$ each represents an identical alkyl radical of the constitution $C_nH_{2n+1}$, where $n$ is a whole number not higher than 5.

5. The monoazo dyestuff of the formula

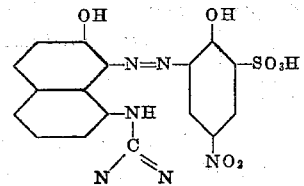

6. The monoazo dyestuff of the formula

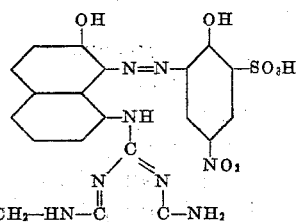

7. The monoazo dyestuff of the formula

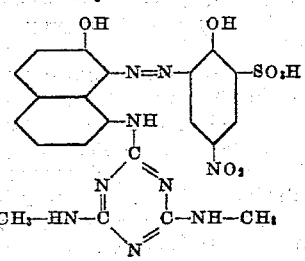

8. The monoazo dyestuff of the formula
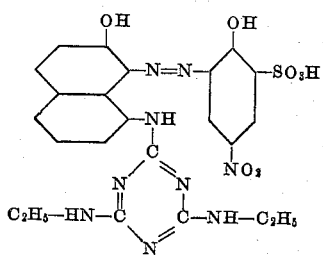
WILLY WIDMER.
ALFRED FASCIATI.
References Cited in the file of this patent
UNITED STATES PATENTS
| Number | Name | Date |
|---|---|---|
| 2,460,618 | Bernasconi | Feb. 1, 1949 |
OTHER REFERENCES
Society Pour L'Industrie Chimique, 906, 128, May 7, 1944.